United States Patent [19]
Santarriaga

[11] Patent Number: 5,495,984
[45] Date of Patent: Mar. 5, 1996

[54] ENERGY SAVING OPTOELECTRONIC CODE READING ACCESS DEVICE

[75] Inventor: Juan Santarriaga, Atizapan de Zaragoza, Mexico

[73] Assignee: Novedades Electronicas Internacionales S.A. de C.V., San Mateo Telocopan Edo., Mexico

[21] Appl. No.: 172,486

[22] Filed: Dec. 22, 1993

[51] Int. Cl.⁶ ................................................. G05D 23/00
[52] U.S. Cl. ........................ 236/46 R; 236/47; 165/11.1
[58] Field of Search ................................. 236/46 R, 47, 236/46; 165/11 R, 11.1; 250/569

[56] References Cited

U.S. PATENT DOCUMENTS

| | | | |
|---|---|---|---|
| 3,971,473 | 7/1976 | Ernst, Jr. et al. | 250/569 X |
| 4,058,740 | 11/1977 | Dalton et al. | 307/116 |
| 4,066,910 | 1/1978 | Swift | 250/555 |
| 4,091,866 | 5/1978 | Curatolo | 236/1 R X |
| 4,101,886 | 7/1978 | Grimes et al. | 165/14 |
| 4,107,941 | 8/1978 | Hamilton | 62/186 |
| 4,136,820 | 1/1979 | Collado et al. | 250/569 X |
| 4,150,415 | 4/1979 | Fichtner | 361/182 |
| 4,223,301 | 9/1980 | Grimes et al. | 340/500 |
| 4,295,051 | 10/1981 | Graf et al. | 250/569 |
| 4,315,596 | 2/1982 | Johnson, Jr. et al. | 165/11 R X |
| 4,333,604 | 6/1982 | Petrillo | 236/47 |
| 4,391,406 | 7/1983 | Fried | 165/11 R X |
| 4,719,363 | 1/1988 | Gallacher | 307/117 |
| 5,127,575 | 7/1992 | Beerbaum | 236/46 R |
| 5,206,521 | 4/1993 | Ruiz et al. | 250/569 |

*Primary Examiner*—William E. Wayner
*Attorney, Agent, or Firm*—Rosenblatt & Redano

[57] ABSTRACT

An energy saving, optoelectronic system provides a means for energizing and deenergizing electrical loads. The system includes a continuous light transmission source and a light receiving circuit that senses a light pattern and, in response, develops a first or a second output signal. The system also includes a gating circuit that receives the output signal. The gating circuit comprises a logic circuit arranged such that the receiving circuit will transmit the second output signal upon receiving a predetermined light signal. The system further includes a power switch that is open in response to an open circuit signal from the gating circuit and is closed in response to close circuit signal from the gating circuit. This system further includes a timing circuit for periodically energizing and deenergizing heating, ventilating, and air-conditioning loads.

21 Claims, 6 Drawing Sheets

ENERGY SAVING OPTOELECTRONIC CODE READING ACCESS DEVICE

BACKGROUND OF THE INVENTION

1. Field of the Invention

This invention relates to the field of energy saving devices which energize and deenergize the electrical loads in a room or in a building when such loads are not required to be in use. Specifically, the invention relates to an optoelectronic switching device which is actuated by an encoded photoelectric switching card which can be inserted in and removed from a card switching box to energize and deenergize HVAC and nonHVAC electrical loads responsive to the switching device. The present invention also comprises an HVAC cycling circuit capable of cycling the HVAC power loads on and off while the nonHVAC loads remain off, thereby providing continued climate control in a room or building where the HVAC systems operate.

2. Description of the Prior Art

A variety of electronic and electromechanical devices have been used to energize and deenergize the electrical loads in a room or building for energy conservation purposes. Many such devices have been designed for application in the hotel/motel industry where guests have been known to leave rooms unoccupied with the lights and other electrical fixtures or systems left on. Such fixtures or systems may include televisions, radios, and heating, ventilating and air-conditioning (HVAC) systems.

A number of prior art switching devices have been designed to energize and deenergize the electrical loads in a room when a person enters or leaves the room. Many of these devices contain a switching device whose actuation is, in whole or in part, dependent upon the operation of a deadbolt or latch. Such devices are disclosed in U.S. Pat. No. 4,580,740 to Dalton et al.; U.S. Pat. No. 4,091,866 to Curatolo; U.S. Pat. No. 4,391,406 to Fried; and U.S. Pat. No. 4,333,604 to Petrillo.

Such deadbolt/latch switching devices have several drawbacks. One drawback is that the electromechanical coupling within the deadbolt/latch device may wear out or malfunction after repeated engagement and disengagement of the latch or deadbolt. Another drawback is that the intended purpose of such systems can be defeated by relatively simple acts, such as stuffing paper or chewing gum in the latch/deadbolt assembly. Another major drawback of deadbolt/latch systems is that in many cases, the room occupant must lock the door after he enters the room. In situations where a room occupant is occupying the room and merely wishes to briefly open his door to look outside or to speak with someone, he must relock the door after it is closed. This can prove to be an annoyance for many room occupants who do not wish to be burdened with relocking their door every time they close it.

Other prior art devices rely upon transmitters and receivers utilizing ultrasonic or radio signals to actuate one or more switches coupled to the energy loads of the room or building. Such devices are disclosed in U.S. Pat. No. 4,150,415 to Fichtner; U.S. Pat. No. 4,223,301 to Grimes et al.; and U.S. Pat. No. 4,101,886 to Grimes et al. The performance of such systems may be adversely affected by stray ultrasonic or radio signals, such as signals from garage door opener transmitters. Also, if a physical object is placed in the room in the path of the ultrasonic or radio signal, such physical object may sufficiently attenuate the signal to adversely affect system operation. Furthermore, the transmission and receiving hardware associated with such systems makes such systems expensive to install and maintain.

Other prior art devices such as those disclosed in U.S. Pat. No. 5,206,521 to Ruiz, et al., merely disclose an optoelectronic system for energizing and deenergizing one set of electrical loads that are electrically coupled to an optoelectronic switching device. Such a system has several drawbacks in practical applications such as a hotel room or other location designed primarily for human habitation. In most situations, the majority of electrical usage in a hotel room or other similar location is for heating, ventilating, and air-conditioning (HVAC), as opposed to lighting, television, and small appliances. Prior art devices fail to provide an energy savings system that deenergizes all nonHVAC electrical loads when the occupant is absent from the room and also periodically energizes and deenergizes HVAC electrical loads to maintain a comfortable climate in the room and conserve energy.

A drawback of the type of system disclosed in U.S. Pat. No. 5,206,521 is that all HVAC loads are deenergized for the duration that the occupant is absent from the room if these loads are controlled by the optoelectronic switching system. For long absences during hot weather, this can result in the room being uncomfortably warm when the occupant returns, thereby requiring an undesirably long cooling period when the HVAC loads are reenergized, before the room is comfortable again. The situation is undesirable. A similar drawback exists during cold weather, requiring an undesirably long heating period when the occupant returns, before the room is comfortable again.

SUMMARY OF THE INVENTION

The present invention relates to an energy saving, optoelectronic system for energizing and deenergizing electrical loads which allows the system user to actuate the system by using a specially encoded photoelectric switching card.

The present invention comprises a light transmission source which emits a light signal. In one embodiment, this light transmission source comprises a multiplicity of individual light sources, such as light emitting diodes, arranged in a predetermined geometric pattern. In a preferred embodiment, this light transmission source is a light transmission circuit.

The present invention further comprises a photoelectric receiving circuit placed to receive a light signal in the form of a light emission pattern from the light transmission source. The photoelectric receiving circuit transmits an output signal in response to the particular light signal received from the light transmission source. When no physical object blocks or alters the light signal emitted by the light transmission source, the photoelectric receiving circuit receives an unabbreviated light signal. In response to this unabbreviated light signal, the photoelectric receiving circuit transmits a first output signal.

The invention further comprises a photoelectric switching card which is removably insertable between the light transmission source and the receiving circuit. When the photoelectric switching card is not inserted between the light transmission source and the photoelectric receiving circuit, the photoelectric receiving circuit receives an unabbreviated light signal from the light transmission source. When the photoelectric switching card is inserted between the light transmission source and the photoelectric receiving circuit, the photoelectric receiving circuit receives a predetermined, unique abbreviated light signal from the light transmission source and transmits a second output signal.

The photoelectric switching card comprises a multiplicity of translucent and nontranslucent regions arranged in a predetermined geometric pattern such that when the photoelectric switching card is inserted in a predetermined location between the light transmission source and the photoelectric receiving circuit, the unabbreviated light signal transmitted by the light transmission source is attenuated in a predetermined manner by the photoelectric switching card such that a predetermined, unique abbreviated light signal reaches the photoelectric receiving circuit. In a preferred embodiment, the predetermined, unique abbreviated light signal is a predetermined, abbreviated light emission pattern.

The switching card's predetermined geometric pattern of translucent and nontranslucent regions constitute the means for encoding the switching card. The use of an encoded switching card prevents the present invention from being defeated by inserting a "dummy" card, such as a credit card, between the light transmission source and the receiving circuit.

The invention further comprises a gating circuit coupled to receive output signals from the photoelectric receiving circuit. When the gating circuit receives a first output signal from the photoelectric receiving circuit, the gating circuit transmits an open circuit signal. When the gating circuit receives a second output signal from the photoelectric receiving circuit, the gating circuit transmits a close circuit signal.

In a preferred embodiment, the photoelectric receiving circuit comprises a multiplicity of photoresistors positioned to receive a light signal from one of the light sources which comprises the light transmission source such that each photoresistor emits an open transistor signal when it receives no light from its respective individual light source and each photoresistor emits a close transistor signal when it receives light from its respective individual light source. The photoelectric receiving circuit further comprises a multiplicity of transistors, each of which is coupled to a photoresistor such that the output of each transistor is a logic state 1 in response to an open transistor signal and a logic state 0 in a close transistor signal.

In a preferred embodiment, the gating circuit comprises a multiplicity of gates arranged to receive output signals from each of the transistors such that only one predetermined combination of transistor output signals will cause the gating circuit to transmit a close circuit signal and all remaining combinations of transistor output signals will cause the gating circuit to transmit an open circuit signal.

The light transmission source, photoelectric receiving circuit, and gating circuit are arranged in a preferred embodiment, such that the transistors transmit the predetermined combination of output signals which cause the gating circuit to transmit a close circuit signal, only in response to receipt of the unique, abbreviated light signal by the photoelectric receiving circuit.

The invention further comprises a first power switch coupled to the gating circuit such that the power switch is opened in response to an open circuit signal from the gating circuit, and the power switch is closed in response to a close circuit signal from the gating circuit. Some or all of the electrical loads in the room or building may be coupled to the first power switch such that they can be energized and deenergized upon actuation and deactuation of the present invention by insertion and removal of the encoded photoelectric switching card.

The invention further comprises a second power switch coupled to the gating circuit such that the second power switch is closed in response to the a close circuit signal from the gating circuit and the second power switch cycles between an open and closed state in response to an open circuit signal from the gating circuit. The cycling of the second power switch is controlled by an HVAC cycling circuit, as further described below. In the present invention, the second power switch is particularly suitable to being coupled to the HVAC power loads in a room or building. Thus, the second power switch is referred to as the "HVAC power switch." In a preferred embodiment, there are several HVAC power switches in the circuitry of this invention.

The present invention further comprises a time delay circuit coupled to the gating circuit such that when the switching card is removed from between the light source and the receiving circuit, the time delay circuit transmits a delay signal to the gating circuit which delays the gating circuit from transmitting an open circuit signal to the first and second power switches for a predetermined time period. This time delay feature allows the occupant of a room or building to remove the switching card from between the light transmission source and the switching circuit and to then have a predetermined time period to leave the room or building before the lights and any other electrical loads connected to the power switches are turned off.

The present invention further comprises an HVAC cycling circuit coupled to the gating circuit such that when the switching card is removed from between the light source and the receiving circuit, the HVAC cycling circuit continues to transmit a close circuit signal to the HVAC power switches for a first predetermined period of time. This period of time can be measured by a timing device such as a timer that measures clock pulses. When this first predetermined period of time elapses, the HVAC cycling circuit then transmits an open circuit signal to the HVAC power switches, thereby deenergizing the HVAC loads. The HVAC loads remain deenergized for a second predetermined period of time, provided that the gating circuit is still transmitting an open circuit signal. The second predetermined time period can also be measured by a timer that measures clock pulses. The HVAC cycling circuit is capable of repeatedly opening and closing the HVAC power switch, thereby alternately energizing and deenergizing the HVAC loads for a first predetermined time period and a second predetermined time period, respectively, as long as the gating circuit continues to transmit an open circuit signal.

The HVAC cycling circuit provides a great advantage over prior art devices in that HVAC power consumption is less than it would be if the HVAC loads remained on and climate conditions in the room where the HVAC loads are directed remain more comfortable than they would be if the HVAC loads were deenergized for the duration of time that the gating circuit transmits an open circuit signal.

In a preferred embodiment, the light transmission circuit, photoelectric receiving circuit and gating circuit are housed in a card switching box equivalent in size to a conventional wall switch box. A face plate having a card receiving slit through which the photoelectric switching card is removably insertable is mounted on the front of the card switching box.

The card switching box can be conveniently mounted on a wall in the room or building near the entry door. When an occupant enters the room or building, he inserts the photoelectric switching card into the slit in the front of the card switching box and all of the electrical loads coupled to the power switch are energized. When the occupant is ready to leave the room or building, he removes the photoelectric switching card from the card switching box and all of the electrical loads coupled to the power switch are deenergized after a predetermined time period which is set in the time delay circuit.

This invention is particularly useful for guests in a hotel room. The photoelectric switching card may also serve as a key ring for the door to the room or building where the energy saving, optoelectronic system is installed.

DESCRIPTION OF THE PREFERRED EMBODIMENTS

Figure 1A:
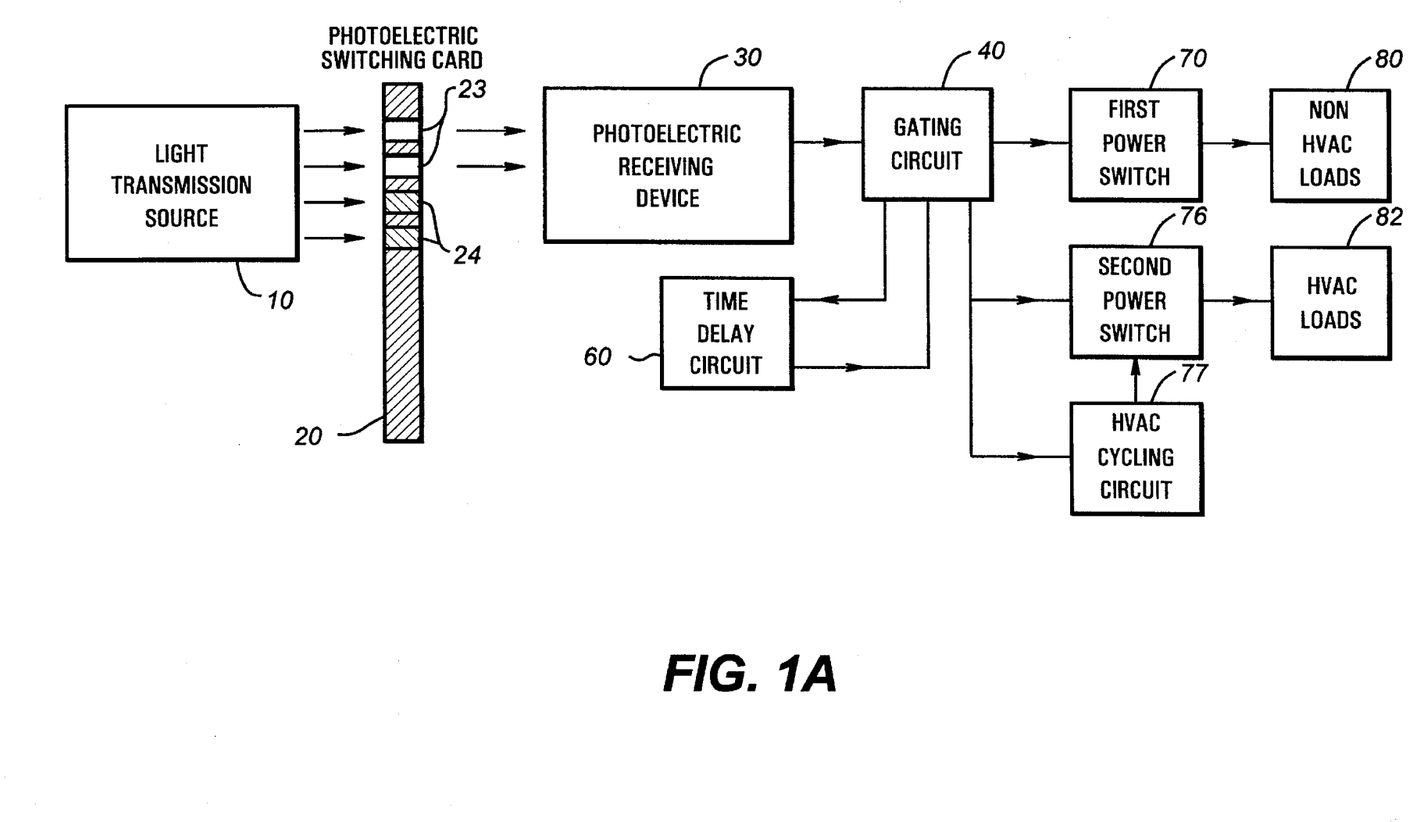
FIGS. 1A and 1B are block diagrams of the present invention.

A basic block diagram of the present invention is shown in FIG. 1A. The light transmission source 10 transmits a light emission pattern which is received by the photoelectric receiving circuit 30. The photoelectric switching card 20 comprises a multiplicity of translucent regions 24 and nontranslucent regions 23. The photoelectric switching card 20 is removably insertable between the light transmission source 10 and the photoelectric receiving circuit 30. The gating circuit 40 is coupled to the photoelectric receiving circuit 30. In response to the signal received from the photoelectric receiving circuit 30, the gating circuit 40 transmits an output signal to the power switch 70 which in turn opens or closes to energize or deenergize loads 80. A time delay circuit 60 is actuated by a signal from the gating circuit 40 to transmit a time delay signal to gating circuit 40.

An HVAC cycling circuit 77 is actuated in response to an open circuit signal from gating circuit 40. HVAC cycling circuit 77 transmits alternate open circuit and close circuit signals to HVAC power switches 75, thereby alternately energizing and deenergizing HVAC loads 82.

Figure 1B:
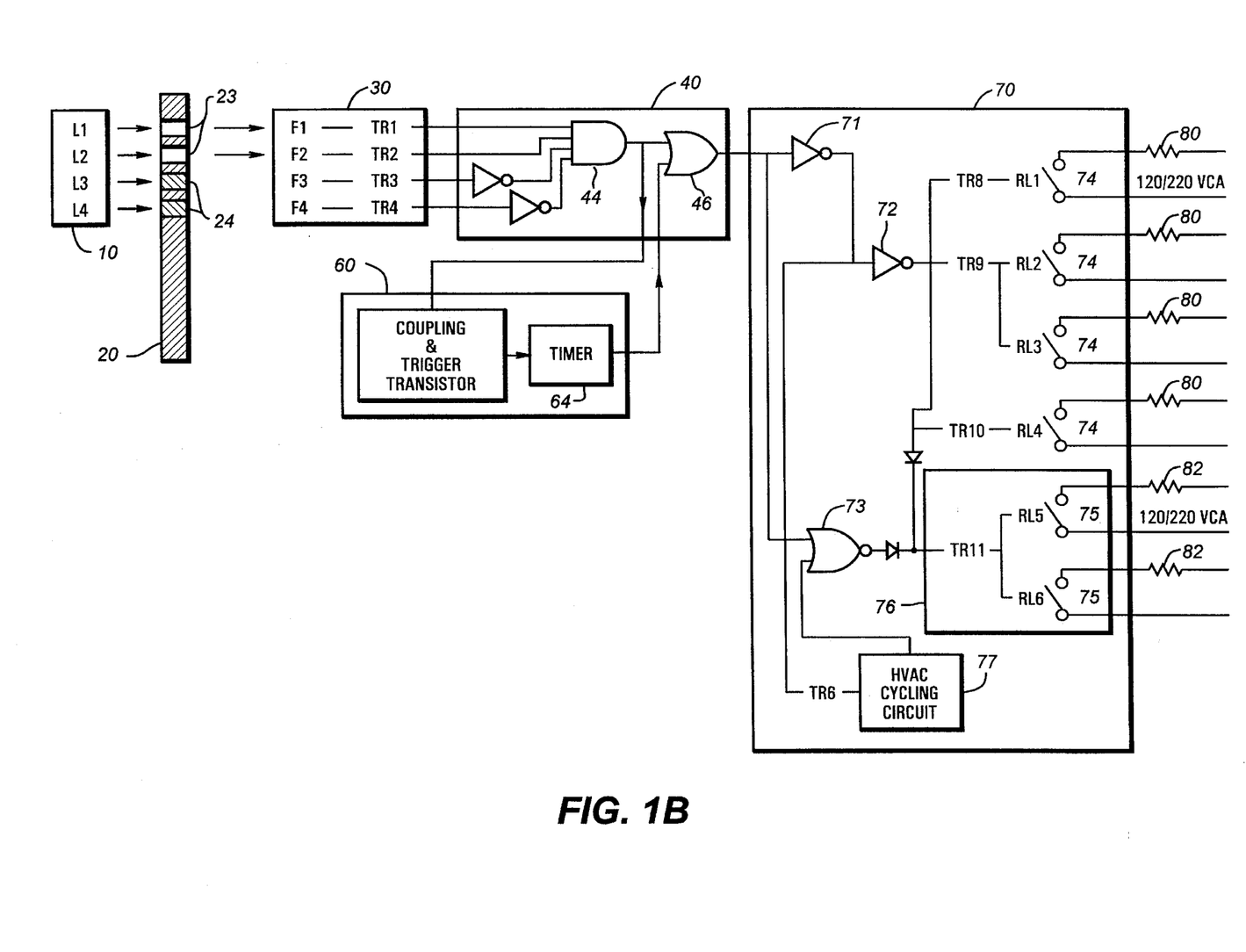

FIG. 1B is a more detailed embodiment of the invention depicted in FIG. 1A. Light transmission source 10 comprises four individual light sources L1–L4. In a preferred embodiment, these light sources L1–L4 are light emitting diodes. Photoelectric receiving circuit 30 comprises four photoresistors F1–F4, each of said photoresistors is coupled to a transistor TR1–TR4, respectively. Each photoresistor F1–F4 emits an open transistor signal when it receives no light from its respective light source L1–L4. Each photoresistor F1–F4 emits a close transistor signal when it receives light from its respective individual light source L1–L4. The output of each transistor TR1–TR4 is a logic state 1 in response to an open transistor signal from its respective photoresistor F1–F4, and a logic state 0 in response to a close transistor signal from its respective photoresistor F1–F4.

Gating circuit 40 receives a combination of output signals from transistors TR1–TR4. The outputs of transistors TR1 and TR2 are fed directly into AND gate 44. The outputs of transistors TR3 and TR4 are fed directly into NOT gates 42. The outputs from NOT gates 42 are fed directly into AND gate 44. The output of AND gate 44 is fed into OR gate 46 and into time delay circuit 60. Gates 42, 44, and 46 of gating circuit 40 are arranged such that only one predetermined combination of output signals from transistors TR1–TR4 will cause gating circuit 40 to transmit a close circuit signal, and all remaining combinations of output signals from transistors TR1–TR4 will cause gating circuit 40 to transmit an open circuit signal. For the embodiment depicted in FIG. 1B, the one predetermined combination of output signals from transistors TR1–TR4 which will cause gating circuit 40 to transmit a close circuit signal is the following combination: TR1 and TR2 transmitting a logic state 1 output signal; and TR3 and TR4 transmitting a logic state 0 output signal.

Transistors TR1–TR4 will transmit the aforesaid predetermined combination of output signals when photoresistors F1 and F2 receive no light from their respective light sources L1 and L2, and when photoresistors F3 and F4 receive light from their respective light sources, L3 and L4. In the embodiment depicted in FIG. 1B, the multiplicity of translucent regions 24 and nontranslucent regions 23 on photoelectric switching card 20 are arranged such that when photoelectric switching card is inserted between light transmission source 10 and photoelectric receiving circuit 30, photoresistors F1 and F2 receive no light, and photoresistors F3 and F4 receive light, thereby causing a close circuit signal to be transmitted by gating circuit 40.

The output from AND gate 44 which feeds into time delay circuit 60, is received by coupling and trigger transistor TR5. When the output of AND gate 44 is a logic state 1, coupling and trigger transistor TR5 actuates timer 64 which delivers a time delay signal to the input of OR gate 46. This time delay signal delays gating circuit 40 from transmitting an open circuit signal to power switch 70 for a predetermined time period.

A preferred embodiment of power switch 70 is depicted in FIG. 1B. Power switch 70 comprises NOT gates 71, 79 electrically coupled in series to the output of gating circuit 40, such that the output of NOT gate 79 is the same as the output of gating circuit 40. NOT gate 79 provides a signal to nonHVAC power switch 74. In a preferred embodiment, as shown in FIG. 1B, power switch 70 contains a multiplicity of power switches 74. In this preferred embodiment, transistors TR8, TR9, TR10, and relays RL1, RL2, RL3, RL4 are connected in series between the output of NOT gate 72 and each power switch 74, as shown in FIG. 1B.

As also shown in FIG. 1B, the output of NOT gate 71 is transmitted to transistor TR6, which is electrically coupled in series with HVAC cycling circuit 77 such that when an open circuit signal is transmitted from gating circuit 40, a close circuit signal is transmitted into transistor TR6, thereby activating transistor TR6 and causing it to produce an open circuit output signal, which is received as an input by HVAC cycling circuit 77. In response to this input signal, an open circuit signal is transmitted out of HVAC cycling circuit 77 into NOR gate 73. As described herein, an open circuit signal corresponds to a logic state 0 and a close circuit signal corresponds to a logic state 1. NOR gate 73 also receives an input from the output of gating circuit 40. Thus, when gating circuit 40 transmits an open circuit signal, the output of NOR gate 73 is a close circuit signal, which passes through diode D12, thereby energizing transistor TR11 and closing HVAC power switch 75. Where the output of gating circuit 40 remains an open circuit signal, the output of NOR gate 73 varies as a function of the output of HVAC cycling circuit 77. Thus, the opening and closing of HVAC power switch 75 can be controlled by varying the output of HVAC cycling circuit 77 into NOR gate 73.

When gating circuit 40 transmits an open circuit signal, an open circuit signal is output from NOT gate 79 into diode D11. Diode D11 inhibits this open circuit signal from reaching transistor TR11.

When gating circuit 40 transmits a close circuit signal, that output is fed directly into NOR gate 73, thereby resulting in an open circuit signal being output from NOR gate 73. Diode D12 inhibits this open circuit signal from reaching transistor TR11. The close circuit signal from gating circuit 40 is twice inverted by NOT gates 71 and 79, resulting in a close circuit signal being input into diode D11. Diode D11 allows this close circuit signal to pass through to transistor TR11, thereby activating transistor TR11 and causing it to produce a close circuit signal that closes HVAC power switch 75.

In a preferred embodiment, as shown in FIG. 1B, power switch 76 comprises a multiplicity of HVAC power switches 75. HVAC cycling circuit 77 will continue to transmit a close circuit signal into NOR gate 73 until a predetermined time is measured by HVAC cycling circuit 77. In a preferred embodiment, as shown in FIG. 1B, a transistor TR11 and relays RL5, RL6 are connected in series between HVAC power switch 75 and the output of NOR gate 73.

Figure 2:
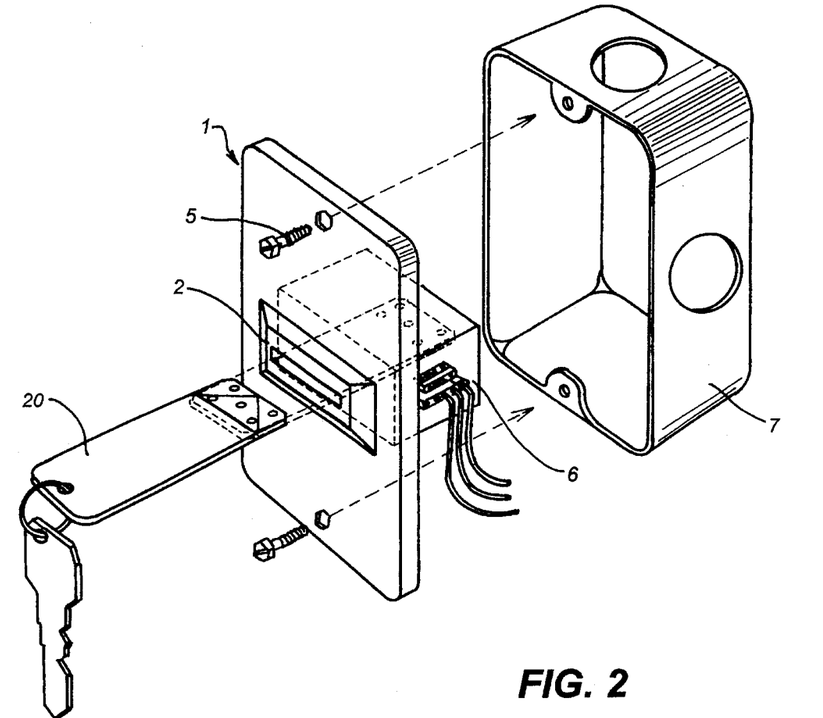
FIG. 2 is an exploded isometric view of the card switching box and photoelectric switching card.

In a preferred embodiment, light transmission source 10, photoelectric receiving circuit 30, and gating circuit 40 are housed in a card switching box 7. Referring to FIG. 2, an exploded isometric view of card switching box 7 and photoelectric switching card 20 is shown. Card switching box 7 comprises face plate 1 having a receiving slit 2 through which photoelectric switching card 20 is removably insertable between light transmission source 10 and photoelectric receiving circuit 30. Face plate 1 is secured to the body of card switching box 7 with two screws 5. Card switching box 7 is equivalent in size to conventional wall switch boxes.

Figure 3:
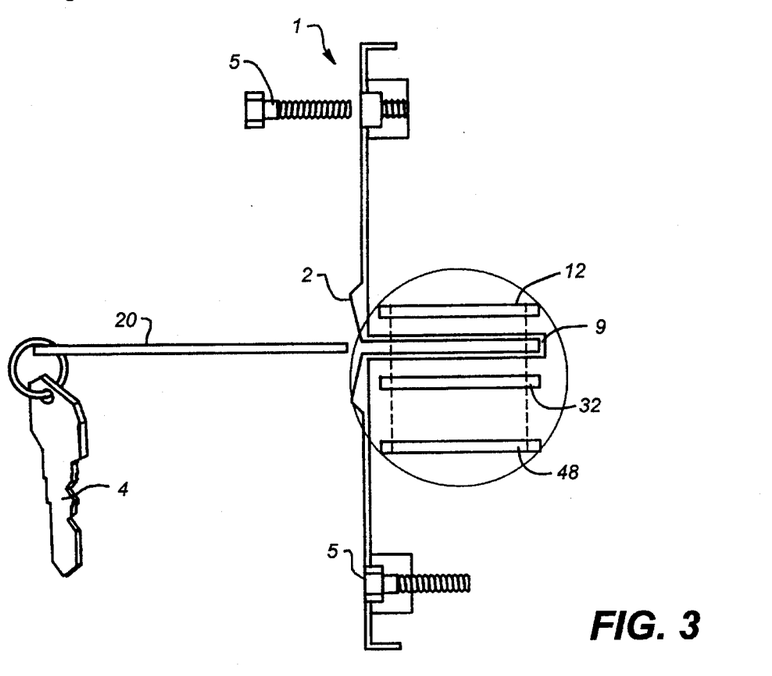
FIG. 3 is a cutaway side view of the card switching box and circuit housing.

In a preferred embodiment, light transmission source 10 is a light transmission circuit mounted on planar circuit board 12. In a preferred embodiment, photoelectric receiving circuit 30 and gating circuit 40 are also mounted on planar circuit boards 32 and 48, respectively, as shown in FIG. 3. Planar circuit boards 12, 32, and 48 are mounted in horizontal planes such that light transmission circuit 12 is mounted above photoelectric receiving circuit 32, and gating circuit 48 is mounted below photoelectric receiving circuit 32. Planar circuits 12, 32, and 48 are housed in circuit board housing 6 attached to the inside of face plate 1, as shown in FIG. 2.

Photoelectric switching card guides 9, mounted on the inside of face plate 1 and contained in circuit board housing 6, are planar guides which establish the predetermined location where photoelectric switching card 20 is inserted in the path of light beams emitted by light sources from light transmission source 10.

Figure 4:
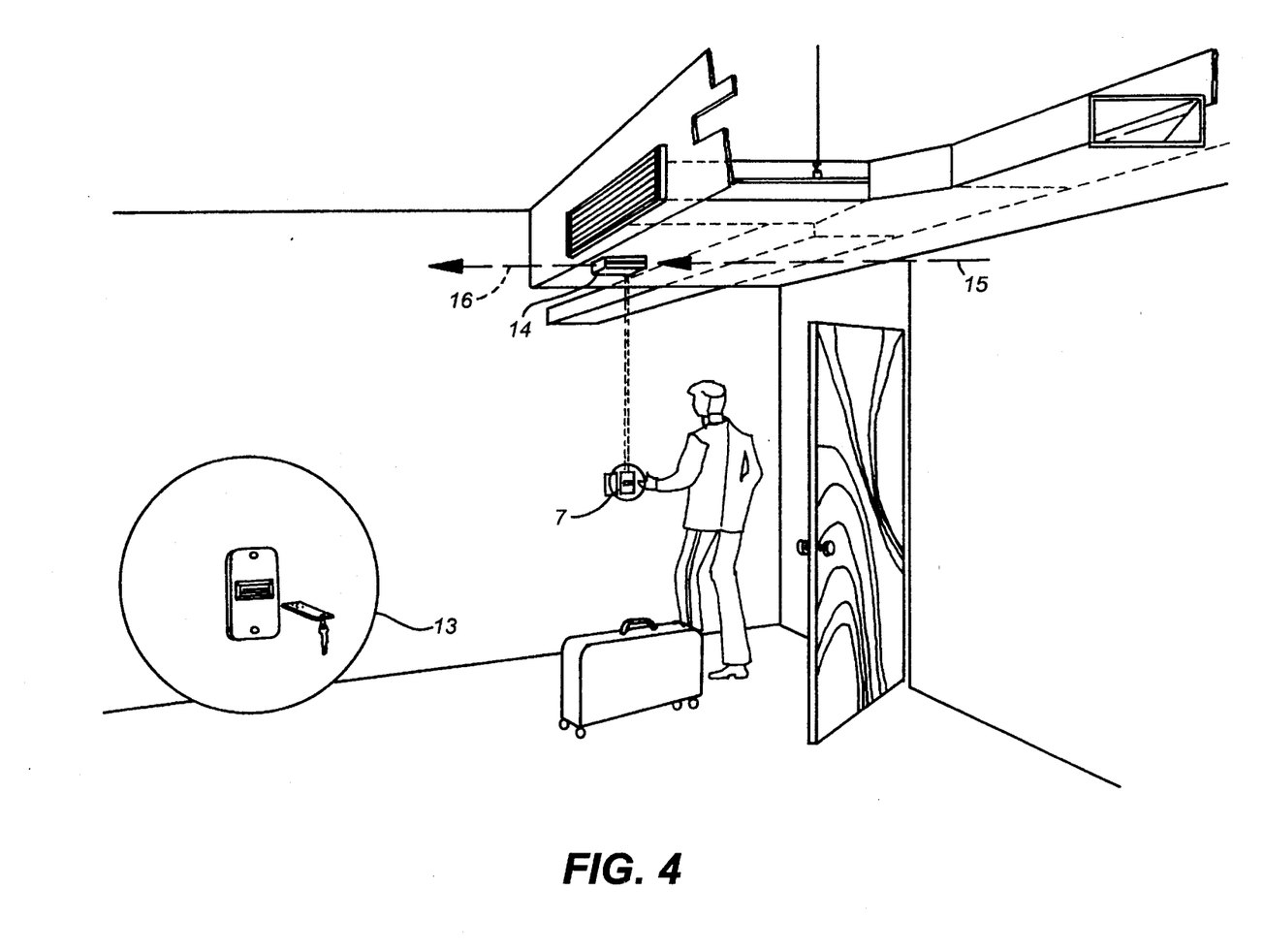
FIG. 4 is a diagram of the energy saving, optoelectronic system installed in a hotel room.

A diagram of the energy saving, optoelectronic system installed in a hotel room is shown in FIG. 4. Card switching box 7 is mounted on the wall conveniently located to the door of the room or building in which the energy saving, optoelectronic system is installed. Power switch 70 is mounted in power switch box 14. In a preferred embodiment, power switch box 14 is mounted outside the view of the normal room user, such as above the dropped ceiling which is present in many rooms. Electrical loads 80 are fed into power switch 70 via electrical load line 15. The electrical output from power switch 70 is transmitted on output load line 16. An enlarged view of face plate 7 and photoelectric switching card 20 is shown in region 13 of FIG. 4.

Figure 5:
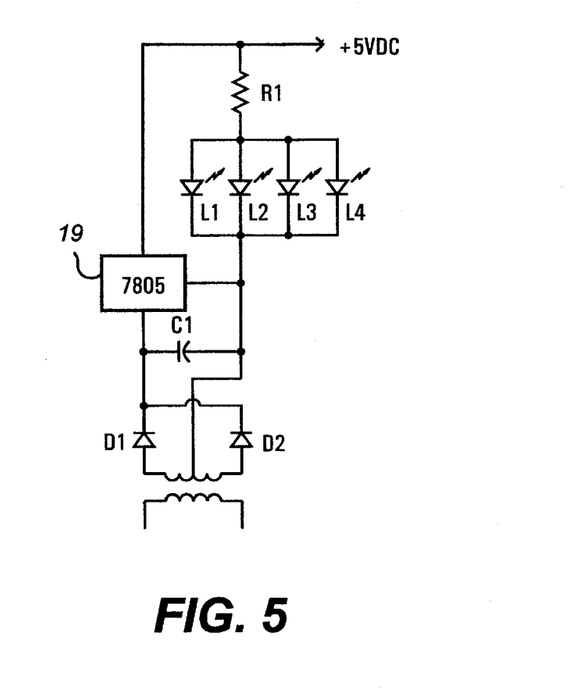
FIG. 5 is a schematic of the light transmission circuit.

A preferred embodiment of light transmission source 10 which is mounted on planar circuit board 12 is depicted in FIG. 5. Diodes D1 and D2 serve to provide a DC voltage input into voltage regulator 19. In a preferred embodiment, voltage regulator 19 is a Model No. 7805 voltage regulator, which delivers an output of 5 volts. Resistor R1 is a 220 ohm resistor coupled in series to light emitting diodes L1–L4.

Figure 6:
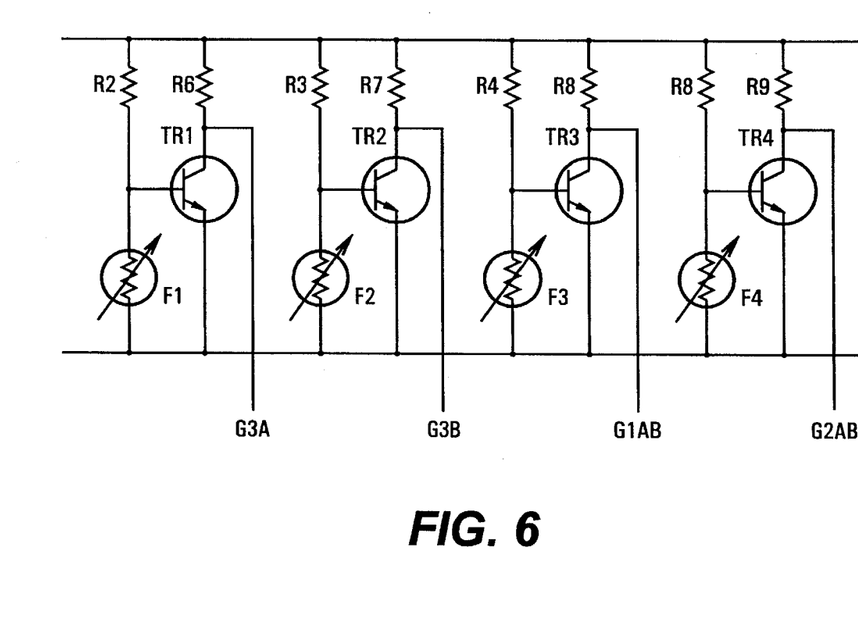
FIG. 6 is a schematic of the photoelectric receiving circuit.

A preferred embodiment of photoelectric receiving circuit 30 is depicted in FIG. 6. Resistors R2–R5 function as voltage dividers which are connected in series with photoresistors F1–F4, respectively. In a preferred embodiment, resistors R2–R5 provide a fixed resistance of 560 kiloohms. Resistor R6 is of a sufficient resistance such that when transistor TR1 is open circuited, the voltage at the collector is approximately 5 volts which corresponds to a logic state 1, and when transistor TR1 is close circuited, the voltage at the collector is approximately 0.3 volts which corresponds to a logic state 0. Resistors R7–R9 operate in the same fashion with respect to transistors TR2–TR4, respectively.

Figure 7:
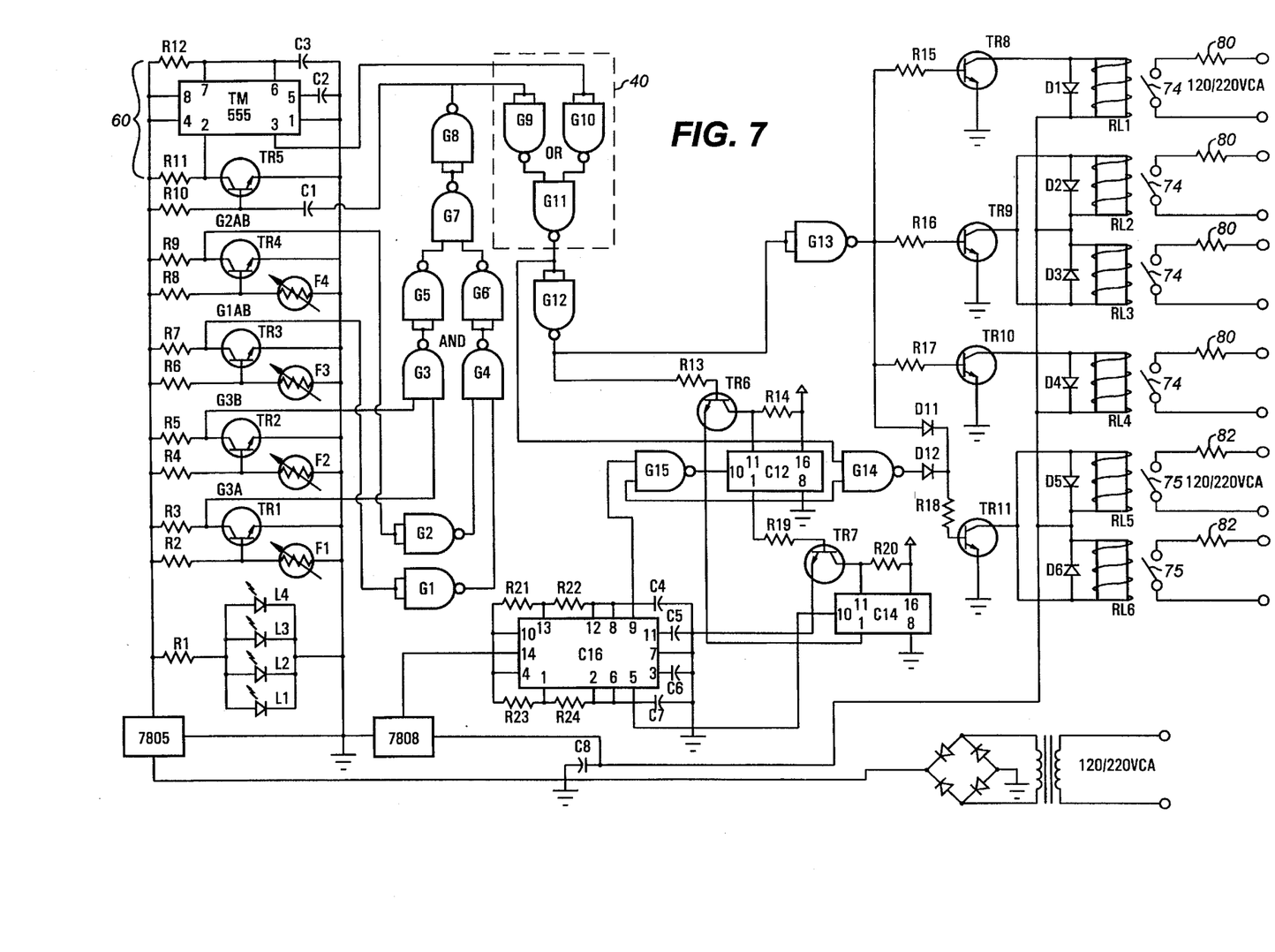
FIG. 7. is a combined schematic of the light transmission circuit, photoelectric receiving circuit, gating circuit, time delay circuit, and power switch.

A preferred embodiment of light transmission source 10, photoelectric receiving circuit 30, gating circuit 40, time delay circuit 60, power switch 70, HVAC cycling circuit 77, and loads 80 is depicted in FIG. 7. NAND gates G1–G8 are configured to receive input from transistors TR1–TR4 such that gating circuit 40 transmits a close circuit signal in response to only one predetermined combination of transistor output signals from transistors TR1–TR4. That one predetermined combination of transistor output signals occurs when TR1 and TR2 transmit a logic state 1 and TR3 and TR4 transmit a logic state 0. In response to this one predetermined combination of output signals from transistors TR1–TR4, the output of NAND gate G8 is a logic state 1. This output state at NAND gate G8 causes coupling and trigger transistor TR5 to trigger timer 64. Timer 64 sends a delay signal to NAND gates G10 and G11, thereby preventing gating circuit 40 from transmitting a close circuit signal to power switch 70 for a predetermined time period. In a preferred embodiment, this predetermined time period is 23 seconds.

HVAC cycling circuit 77 of FIG. 1B is shown in greater detail in FIG. 7. When an open circuit signal is transmitted from NAND gate G11, that signal is inverted by NOR gate G12 to produce a close circuit signal that is input into transistor TR6. In response to this close circuit signal, transistor TR6 outputs an open circuit signal, thereby activating a first timer, shown in FIG. 7 as binary counter CI2.

Binary counter CI2 receives clock pulses from clock CI6 through NOR gate G15. Binary counter CI2 counts these clock pulses for a first predetermined period of time, thereby emitting an open circuit signal into NOR gate G14, resulting in the activation of transistor TR11 and the closure of power switches 75.

Once binary counter CI2 has counted a predetermined number of clock pulses, for a first predetermined period of time, it transmits a close circuit signal into NOR gate G14, thereby resulting in an open circuit signal being transmitted from NOR gate G14 and power switches 75 opening, resulting in the HVAC power loads being deenergized. At the time that a close circuit signal is transmitted from binary counter CI2, clock pulses cease being transmitted through NOR gate 15.

The transmission of a close circuit signal from binary counter CI2 results in the activation of a second timer, shown in FIG. 7 as binary counter CI4, that is programmed to count a second predetermined number of pulses for a second predetermined period of time. Binary counter CI4 counts the pulses from clock CI6. Once binary counter CI4 has counted clock pulses for a second predetermined period of time, binary counter CI4 transmits a pulse through its outlet 1 that makes binary counter CI2 start counting again for a first predetermined period of time. Once binary counter CI2 resumes counting, power switches 75 are again closed, thereby energizing HVAC loads 82 for a first predetermined period of time.

In a preferred embodiment, the first timer and the second timer are adjustable to vary the duration of the first predetermined period of time and second predetermined period of time, respectively. As ambient temperature conditions change throughout the seasons in a room or building where the present invention is installed, it may be desirable to change the set points on the first timer or the second timer to achieve a change in the cycling characteristics of the HVAC cycling circuit.

As long as a gating circuit 40 continues to transmit an open circuit signal, binary counters CI2 and CI4 will continue to alternately count for a first predetermined period of time and a second period of time, respectively, as described above, resulting in a cycling of the HVAC power loads. The optimum duration of the first predetermined period of time and second predetermined period of time will vary according to the particular characteristics of the HVAC system and ambient climate conditions where the invention is installed.

Many modifications and variations may be made in the embodiments described herein and depicted in the accompanying drawings without departing from the concept of the present invention. Accordingly, it is clearly understood that the embodiments described and illustrated herein are illustrative only and are not intended as a limitation upon the scope of the present invention.

What is claimed is:

1. An energy saving, optoelectronic system for energizing and deenergizing electrical loads, comprising:

(a) a light transmission source emitting a continuous light signal;

(b) a photoelectric receiving circuit placed to receive a continuous light signal from said light transmission source, and to transmit a first output signal or a second output signal in response to the particular light signal received from said light transmission source;

(c) a photoelectric switching card removably insertable between said light transmission source and said receiving circuit, such that when said switching card is not inserted, said receiving circuit receives an unabbreviated light signal from said light transmission source and transmits a first output signal, and when said switching card is inserted, said receiving circuit receives a predetermined, unique, abbreviated light signal from said light source and transmits a second output signal;

(d) a gating circuit coupled to receive output signals from said receiving circuit such that said gating circuit transmits an open circuit signal in response to a first output signal and transmits a close circuit signal in response to a second output signal, the gating circuit comprising NOT gates arranged such that the receiving circuit will transmit the second output signal upon receiving the predetermined light signal;

(e) a first power switch coupled to said gating circuit such that it is open in response to an open circuit signal from said gating circuit and said first power switch is closed in response to a close circuit signal from said gating circuit;

(f) a second power switch coupled to said gating circuit such that it is closed in response to a close circuit signal from said gating circuit; and (g) a cycling circuit coupled to said gating circuit and to said second power switch such that when said gating circuit transmits an open circuit signal, said cycling circuit will repeatedly open and close the second power switch.

2. The energy saving, optoelectronic system of claim 1 further comprising a time delay circuit coupled to said gating circuit such that when said switching card is removed from between said light source and said receiving circuit, said time delay circuit transmits a delay signal to said gating circuit which delays said gating circuit from transmitting an open circuit signal to said first and second power switches for a predetermined time period.

3. The energy saving, optoelectronic system of claim 1 wherein said light transmission source comprises a multiplicity of individual light sources arranged in a predetermined geometric pattern.

4. The energy saving, optoelectronic system of claim 3 wherein said photoelectric receiving circuit comprises:

(a) a multiplicity of photoresistors, each of said photoresistors positioned to receive a light signal from one of said individual light sources such that each of said photoresistors emits an open transistor signal when it receives no light from said individual light source and emits a close transistor signal when it receives light from said individual light source; and (b) a multiplicity of transistors, each of said transistors coupled to each of said photoresistors, such that the output of each of said transistors is a logic state 1 in response to an open transistor signal and a logic state 0 in response to a close transistor signal.

5. The energy saving, optoelectronic system of claim 4 wherein said gating circuit comprises a multiplicity of gates arranged to receive output signals from each of said transistors such that only one predetermined combination of output signals from said transistors will cause said gating circuit to transmit a close circuit signal and all remaining combinations of output signals from said transistors will cause said gating circuit to transmit an open circuit signal.

6. The energy saving, optoelectronic system of claim 5 wherein said photoelectric switching card comprises a predetermined geometric pattern of translucent and nontranslucent regions such that when said switching card is inserted between said light source and said photoelectric receiving circuit, a predetermined, unique combination of output signals is transmitted by said transistors.

7. The energy saving, optoelectronic system of claim 3 wherein said photoelectric switching card comprises a predetermined geometric pattern of translucent and nontranslucent regions such that when said switching card is inserted between said light transmission source and said photoelectric receiving circuit, a predetermined, unique geometric pattern of light from preselected individual light sources is received by said receiving circuit.

8. The energy saving, optoelectronic system of claim 4 wherein said light transmission source, said photoelectric receiving circuit, and said gating circuit are housed in a card switching box equivalent in size to conventional wall switch boxes, said switching box comprising a face plate having a card receiving slit through which said photoelectric switching card is removably insertable between said light transmission source and said photoelectric receiving circuit.

9. The energy saving, optoelectronic system of claim 8 wherein said light transmission source, said photoelectric receiving circuit, and said gating circuit are each mounted on a planar circuit board.

10. The energy saving optoelectronic system of claim 1, further comprising:
   (a) nonHVAC electrical loads coupled to said first power switch; and
   (b) HVAC electrical loads coupled to said second power switch.

11. The energy saving, optoelectronic system of claim 10 wherein said cycling circuit comprises:
   (a) a clock capable of generating clock pulses;
   (b) a first timer electrically coupled to said clock and configured to count clock pulses for a first predetermined period of time thereby resulting in said cycling circuit transmitting an open circuit signal for a first predetermined period of time; and
   (c) a second timer electrically coupled to said clock and configured to count clock pulses for a second predetermined period of time thereby resulting in said cycling circuit transmitting a close circuit signal for a second predetermined period of time.

12. An energy saving, optoelectronic system for energizing and deenergizing electrical loads in a building, comprising;
   (a) a light transmission circuit comprising a multiplicity of continuous light sources arranged in a predetermined geometric pattern, each of said light sources emitting an individual light beam such that said light sources collectively transmit a predetermined light emission pattern;
   (b) a photoelectric switching card comprising a multiplicity of translucent and nontranslucent regions arranged in a predetermined geometric pattern such that when said switching card is inserted in a predetermined location in the path of light beams emitted by said light sources, a predetermined abbreviated light emission pattern passes through said switching card;
   (c) a photoelectric receiving circuit placed to receive a continuous light emission pattern from said light sources such that when an unabbreviated continuous light emission pattern is received, said receiving circuit transmits a first output signal and when a predetermined abbreviated continuous light emission pattern is received, said receiving circuit transmits a second output signal;
   (d) a gating circuit coupled to receive output signals from said receiving circuit such that said gating circuit transmits an open circuit signal in response to a first output signal and transmits a close circuit signal in response to a second output signal, the gating circuit comprising NOT gates arranged such that the receiving circuit will transmit the second output signal upon receiving the predetermined light signal;
   (e) a first power switch coupled to said gating circuit such that it is open in response to an open circuit signal from said gating circuit and said first power switch is closed in response to a close circuit signal from said gating circuit;
   (f) a second power switch coupled to said gating circuit such that it is closed in response to a close circuit signal from said gating circuit; and
   (g) a cycling circuit coupled to said gating circuit and to said second power switch such that when said gating circuit transmits an open circuit signal, said cycling circuit will repeatedly open and close the second power switch.

13. The energy saving, optoelectronic system of claim 12 further comprising a time delay circuit coupled to said gating circuit such that when said switching card is removed from between said light source and said receiving circuit, said time delay circuit transmits a delay signal to said gating circuit which delays said gating circuit from transmitting an open circuit signal to said power switch for a predetermined time period.

14. The energy saving, optoelectronic system of claim 13 wherein said cycling circuit comprises:
   (a) a clock capable of generating clock pulses;
   (b) a first timer electrically coupled to said clock and configured to count clock pulses for a first predetermined period of time thereby resulting in said cycling circuit transmitting an open circuit signal for a first predetermined period of time; and
   (c) a second timer electrically coupled to said clock and configured to count clock pulses for a second predetermined period of time thereby resulting in said cycling circuit transmitting a close circuit signal for a second predetermined period of time.

15. The energy saving, optoelectronic system of claim 14 wherein said first time and said second timer are adjustable such that the duration of the first predetermined period of time and the second predetermined period of time are adjustable.

16. The energy saving, optoelectronic system of claim 14 wherein said card switching box comprises a face plate having a receiving slit through which said photoelectric switching card is removably insertable in a horizontal plane between said light transmission circuit and said photoelectric receiving circuit.

17. The energy saving, optoelectronic system of claim 12 further comprising:
   (a) nonHVAC power loads coupled to said first power switch; and
   (b) HVAC power loads coupled to said second power switch.

18. The energy saving, optoelectronic system of claim 12 wherein said photoelectric receiving circuit comprises a multiplicity of transistors, each of said transistors producing an output signal in response to the light emission pattern received from said light emission sources, such that said transistors transmit a predetermined combination of output signals only in response to a predetermined abbreviated light emission pattern.

19. The energy saving, optoelectronic system of claim 12 wherein said light transmission circuit, said photoelectric receiving circuit, and said gating circuit are each mounted on a planar circuit board.

20. The energy saving, optoelectronic system of claim 19 wherein said planar circuit boards are housed in a card switching box equivalent in size to conventional wall switch boxes.

21. An energy saving, optoelectronic system for energizing and deenergizing electrical loads in a hotel, comprising:
   (a) a light transmission circuit mounted on a planar circuit board comprising a multiplicity of light emitting diodes arranged in a predetermined geometric pattern, each of said light emitting diodes emitting an individual continuous light beam such that said light emitting diodes collectively transmit a light emission pattern;
   (b) a photoelectric switching card equivalent in size to a conventional credit card, said photoelectric switching card comprising a multiplicity of translucent and nontranslucent regions arranged in a predetermined geometric pattern such that when said switching card is inserted in a predetermined location in the path of light emitted by said light emitting diodes, a predetermined abbreviated light emission pattern passes through said switching card;

(c) a photoelectric receiving circuit mounted on a planar circuit board, said photoelectric receiving circuit placed to receive a continuous light emission pattern from said light emitting diodes such that when an unabbreviated continuous light emission pattern is received, said receiving circuit transmits a first output signal and when a predetermined abbreviated continuous light emission pattern is received, said receiving circuit transmits a second output signal;

(d) a gating circuit mounted on a planar circuit board, said gating circuit coupled to receive output signals from said receiving circuit such that said gating circuit transmits an open circuit signal in response to a first output signal and transmits a close circuit signal in response to a second output signal, the gating circuit comprising NOT gates arranged such that the receiving circuit will transmit the second output signal upon receiving the predetermined light signal;

(e) a first power switch coupled to said gating circuit such that it is open in response to an open circuit signal from said gating circuit and said first power switch is closed in response to a close circuit signal from said gating circuit;

(f) a time delay circuit coupled to said gating circuit such that when said switching card is removed from between said light transmission circuit and said receiving circuit, said time delay circuit transmits a delay signal to said gating circuit which delays said gating circuit from transmitting an open circuit signal to said power switch for a predetermined time period;

(g) a second power switch coupled to said gating circuit such that it is closed in response to a close circuit signal from said gating circuit; and (h) a cycling circuit coupled to said gating circuit and to said second power switch such that when said gating circuit transmits an open circuit signal, said cycling circuit will repeatedly open and close the second power switch.

* * * * *